United States Patent Office 3,081,347
Patented Mar. 12, 1963

3,081,347
PREPARATION OF POLYAMINOMETHYL
AROMATIC COMPOUNDS
Ralph J. Leary, Elizabeth, N.J., assignor to Esso Research
and Engineering Company, a corporation of Delaware
No Drawing. Filed Dec. 29, 1958, Ser. No. 783,112
3 Claims. (Cl. 260—570.9)

The present invention relates to a new and improved method of preparing polyformyl aromatic compounds. More particularly it relates to preparing these polyformyl aromatics by reacting polychloromethyl aromatics with 2-nitropropane neutralized with a strong base to a pH in the range of 4–7. This invention also relates to a new and improved method of preparing polyaminomethyl aromatic compounds by the process of reacting polyformyl aromatic compounds preferably prepared as above with hydroxylamine to form the polyoxime and then reducing with hydrogen in the presence of excess ammonia and a hydrogenation catalyst to form polyaminomethyl aromatic compounds. Thus, by combining the present invention method of preparing the polyformyl aromatic compounds with the present method of preparing the polyaminomethyl aromatic compounds, an economical integrated process is obtained. In the above discussion and throughout this application, the terms polychloromethyl, polyformyl, polyaminomethyl, etc. are intended to include only the bis and tris compounds.

The polyaldehydes of the present invention, besides having commercial applications as such, also may be used as intermediates for the preparation of poly acids, for example, the important terephthalic acid and also polyaminomethyl aromatic compounds. With respect to the latter, the polyaminomethyl aromatic compounds prepared by this invention are important in the commercial preparation of polyamide fibers.

The starting materials utilized to form the polyformyl aromatic compounds as previously indicated, are polychloromethyl aromatics. These materials may be represented by the following structural formula:

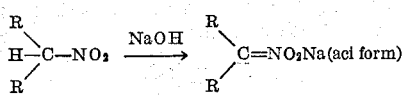

wherein $X=CH_2Cl$ or H or a $C_1-C_{12}$ alkyl group and $R_1$, $R_2$ and $R_3=H$ or a $C_1-C_{12}$ alkyl group. Thus, the starting materials may be for example, 4,6-bis-chloromethyl-meta-xylene, bis-chloromethyl-durene, 2,4-bis-chloromethyl-toluene, 2,5-bis-chloromethyl-para-xylene, tri-chloromethyl-mesitylene, 2,4-bis-chloromethyl-cumene, para-xylylene chloride. Additional examples of starting materials are: 2,6-bis-chloromethyl-toluene, 2,6-bis-chloromethyl-meta-xylene, 2,3 or 2,6-bis-chloromethyl-para-xylene, di-chloromethyl-mesitylene, 2,6-bis-chloromethyl-cumene, 2,4 or 2,6-bis-chloromethyl-tertiary butyl benzene, ortho or meta-xylene chloride. These materials are reacted in accordance with the following diagrammatically illustrated reactions.

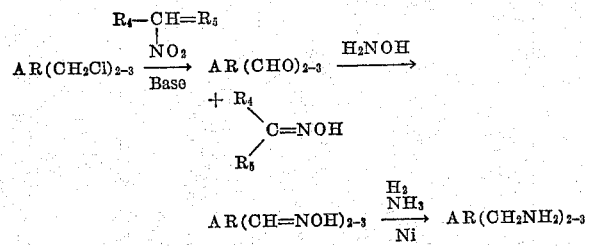

In the above, "AR" represents the benzene ring of the components previously described above and $R_4$ and $R_5$ are methyl or ethyl groups. The polychloromethyl aromatic starting materials are well known and can be prepared, for example, by reacting an aromatic material with a mixture of aqueous formaldehyde and concentrated hydrochloric acid. It is preferred, however, to prepare these materials by the method disclosed in co-pending application Serial No. 474,295, now Patent No. 2,873,299, where it is disclosed to react the aromatic material with a chloromethyl ether.

For the above diagrammatically illustrated reaction of the polychloromethyl aromatic to form the polyaldehyde, temperatures are 20 to 100° C., preferably 60 to 85° C., and reaction times are ½ to 24 hours, preferably 1 to 2 hours. The acidic nitrobenzene is neutralized with a base so that the reaction proceeds in a neutral or slightly acidic medium. Thus, it is preferred that the solution be basic enough so that the nitroparaffin is converted to its aci form, e.g.

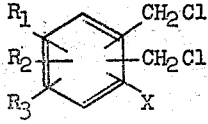

More particularly, it is preferred to maintain the pH of the solution in the range of 4–7, preferably 6–7. Any of the well-known strong bases such as NaOH, KOH, sodium alkoxide, or potassium alkoxide can be used. It is likewise preferred to use a slight excess over stoichiometric amounts of the nitroparaffin to react with the aromatic material. Also it is preferred to use the lower nitroparaffins, particularly 2-nitropropane. Following reaction, filtration is conducted to remove any salts formed in the reaction, the filtrate is concentrated to a small volume, and the desired products of the reaction are obtained by some method of separation.

Both tetramethylterephthalaldehyde and 4,6-dimethyl-isophthalaldehyde have been prepared by this reaction with respectively bis-chloromethyl-durene and 4,6-bis-chloromethyl-m-xylene being employed as the starting materials.

Referring to the reactions outlined above, the polyaldehyde is reacted with hydroxylamine at temperatures of 20 to 100° C., preferably 80 to 90° C. for a period of 10 to 120 minutes, preferably 30 minutes. The polyoxime is then reduced in the presence of excess ammonia in a ratio of 20:1 to 5:1 in the presence of Raney nickel catalyst or other similar hydrogenation catalyst, such as platinum oxide or palladium on carbon catalyst, at temperatures of 100–200° C., preferably 150 to 175° C., specifically 160° C. for 30 minutes to 5 hours, preferably 2 to 3 hours, specifically 2.5 hours. The catalyst is removed and the product is purified to obtain the desired polyaminomethyl aromatic. High yields are thus obtained.

The process of the present invention provides large advantages over the processes previously available in the prior art. Thus, according to the prior art method of preparing aromatic dialdehydes for example, disclosed in U.S. Patent 2,806,883, a two-step conversion of the bis-chloromethyl aromatic is required. Thus, the bis-chloromethyl aromatic is first converted to a bis-hydroxymethyl aromatic and this material is then oxidized with nitrobenzene to obtain the dialdehyde. It can easily be seen that the present invention provides advantages of a one-step operation. Additionally, in the prior art process, the oxidation step is difficult to control in that over-oxidation to form acids may occur. It is also noted that in this prior art method, the problem of avoiding explosive intermediates which may be formed in this reaction must be overcome.

Over the prior art method of preparing polyaminomethyl aromatics, as disclosed in U.S. Patent 2,640,080, wherein a bis-chloromethyl compound is reacted with excess ammonia at high pressures and temperatures and the product is isolated by salting it out from the aqueous solution with sodium hydroxide pellets, the present invention offers large advantages. Thus, the improvements over this patent are: (1) by the reductive preparation there is no formation of secondary and tertiary amines whereas when bis-chloromethyl compounds are treated with ammonia the product is contaminated with these side products (2) the yields of primary amines are higher in the reductive preparation and, (3) in the prior art method of preparation the bis-aminomethyl derivatives are obtained in aqueous solution and have to be isolated by salting them out with sodium hydroxide pellets whereas in the reductive preparation the isolation is much simpler since the product is never in an aqueous solution, and therefore, can be obtained by distillation or by crystallization.

The process of the preesnt invention will be more clearly understood from a consideration of the following examples disclosing laboratory experiments wherein in Example I the aldehyde is prepared and in Example II the bis-aminomethyl material is prepared.

*Example I*

To a warm alcoholic solution of two moles of sodium ethoxide were added two moles of 2-nitropropane. The mixture was stirred and in one case (a) one mole of bis-chloromethyl-durene and in the other (b) one mole of bis-chloromethyl-meta-xylene were added to separate batches of the material. The bis-chloromethyl compound can be added as an alcoholic solution, an alcoholic slurry, or as a solid, but in the experiment for which data is reported, an alcoholic solution was used. When the addition was complete the reaction mixture was refluxed for 1.5 to 2 hours, filtered while hot to remove the sodium chloride, and the filtrate concentrated to a small volume. Upon cooling to room temperature, the mixture was filtered to remove the first crop of dialdehyde. The product was washed with water and dried. A second crop of dialdehyde was obtained by concentrating the mother liquor to dryness and dissolving the residue in an ether-water mixture. The ether layer was separated, extracted with 10% sodium hydroxide, and washed with water until the washings were neutral to litmus. The ether was dried and evaporated to dryness to yield the second crop of dialdehyde. Tetramethylterephthaladehyde was obtained in 90% yield and 4,6-dimethylisophthaldehyde in 83% yield. The tetramethylterephthalaldehyde was recrystallized from ethanol to give pure material melting at 187° on a preheated bar. The 4,6-dimethylisophtalaldehyde was distilled at 110° and 0.4 mm. and was recrystallized from 50% acetic acid to give pure material melting at 107°.

*Example II*

An alcoholic solution of one mole of durene dialdehyde was added to an aqueous solution of two moles of hydroxylamine. The mixture was heated on a steam bath for 30 minutes and then let stand to crystallize. The dioxime which precipitated upon cooling was collected by filtration and washed with water. The dioxime was reduced in the presence of excess ammonia (20:1 ratio) and Raney nickel catalyst. In the experiment the bomb was pressured with 1000 pounds of hydrogen and heated at 110° C. for 1.5 hours. The reaction mixture was dissolved in ethanol and the catalyst removed by filtration. The filtrate was concentrated to remove the ethanol and the solid residue was distilled at 120–130° C. and 0.1 mm. A 70% yield of bis-aminomethyl-durene, melting at 120–121°, was obtained. In this reaction some starting material was recovered, thus indicating that the yield of product could be increased if a higher reaction temperature or a longer reaction time was employed.

What is claimed is:

1. A process for preparing a polyaminomethyl aromatic compound which comprises reacting a polychloromethyl aromatic compound with a material selected from the group consisting of 2-nitropropane, 2-nitrobutane and secondary nitropentanes, said material having been neutralized with a strong base to a pH in the range of 4–7 to obtain a polyformyl aromatic compound, reacting said polyformyl aromatic compound with hydroxylamine to form a polyoxime and then catalytically hydrogenating the polyoxime in the presence of excess ammonia to the corresponding polyaminomethyl aromatic compound, said polychloromethyl aromatic compound being a compound represented by the following structural formula:

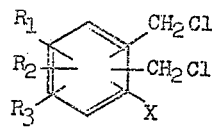

wherein X is selected from the group consisting of $CH_2Cl$, H and $C_1$–$C_{12}$ alkyl groups and $R_1$, $R_2$ and $R_3$ are selected from the group consisting of H and $C_1$–$C_{12}$ alkyl groups.

2. The process of claim 1 in which the polyformyl aromatic compound is reacted with hydroxylamine at temperatures of 20 to 100° C. and for a time of 10 to 120 minutes, and the polyoxime is catalytically hydrogenated in the presence of excess ammonia in the ratio of 20:1 to 5:1 at temperatures of 100 to 200° C. for 30 minutes to 5 hours.

3. The process of claim 1 in which the polychloromethyl aromatic compound is bis-chloromethyl-durene.

References Cited in the file of this patent
UNITED STATES PATENTS

| | | |
|---|---|---|
| 2,668,116 | Wolf | Feb. 2, 1954 |
| 2,711,428 | Goodson | June 21, 1955 |
| 2,899,465 | Girard et al. | Aug. 11, 1959 |
| 2,907,793 | Craig | Oct. 6, 1959 |
| 2,948,756 | Bengelsdorf | Aug. 9, 1960 |

FOREIGN PATENTS

| | | |
|---|---|---|
| 646,594 | Great Britain | Nov. 22, 1950 |
| 825,547 | Germany | Dec. 20, 1951 |
| 837,691 | Germany | May 2, 1952 |